US012764096B2

(12) United States Patent
Malboubi et al.

(10) Patent No.: US 12,764,096 B2
(45) Date of Patent: *Oct. 13, 2026

(54) METHODS, SYSTEMS, AND DEVICES FOR SOFTWARE DEFINED NETWORK MONITORING

(71) Applicant: AT&T Intellectual Property I, L.P., Atlanta, GA (US)

(72) Inventors: Mehdi Malboubi, San Ramon, CA (US); Baofeng Jiang, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/910,796

(22) Filed: Oct. 9, 2024

(65) Prior Publication Data

US 2025/0030664 A1 Jan. 23, 2025

Related U.S. Application Data

(63) Continuation of application No. 17/941,259, filed on Sep. 9, 2022, now Pat. No. 12,143,361.

(51) Int. Cl.
*H04L 9/40* (2022.01)
*H04L 45/76* (2022.01)

(52) U.S. Cl.
CPC .......... *H04L 63/0245* (2013.01); *H04L 45/76* (2022.05); *H04L 63/1458* (2013.01)

(58) Field of Classification Search
CPC .. H04L 63/0245; H04L 45/76; H04L 63/1458
See application file for complete search history.

(56) References Cited

U.S. PATENT DOCUMENTS

| | | | | |
|---|---|---|---|---|
| 6,142,942 | A | 11/2000 | Clark | |
| 12,267,343 | B2 * | 4/2025 | Fainberg | H04L 63/1433 |
| 2004/0208364 | A1 | 10/2004 | Haque et al. | |
| 2007/0223570 | A1 | 9/2007 | Goto | |
| 2016/0006755 | A1 | 1/2016 | Donnelly et al. | |
| 2016/0036813 | A1 * | 2/2016 | Wakumoto | H04L 63/0272 713/171 |
| 2017/0142071 | A1 * | 5/2017 | Curcio | H04L 63/0281 |
| 2023/0208848 | A1 * | 6/2023 | Fainberg | H04L 63/101 726/3 |
| 2024/0089237 | A1 | 3/2024 | Malboubi et al. | |

* cited by examiner

*Primary Examiner* — El Hadji M Sall
(74) *Attorney, Agent, or Firm* — GUNTIN & GUST, PLC.; Atanu Das

(57) ABSTRACT

Aspects of the subject disclosure may include, for example, determining a group of coefficients for a digital filter, and configuring the digital filter according to the group of coefficients. Further embodiments can include processing a group of statistics associated with a first data flow utilizing the digital filter, and determining a first statistic from the group of statistics does not satisfy a statistical threshold resulting in a first determination. Other embodiments are disclosed.

20 Claims, 10 Drawing Sheets

200

200

205

210

230

240

300

600

METHODS, SYSTEMS, AND DEVICES FOR SOFTWARE DEFINED NETWORK MONITORING

CROSS REFERENCE TO RELATED APPLICATIONS

This application is a continuation of U.S. patent application Ser. No. 17/941,259 filed on Sep. 9, 2022. All sections of the aforementioned application are incorporated herein by reference in their entirety.

FIELD OF THE DISCLOSURE

The subject disclosure relates to methods, systems, and devices for software defined network monitoring.

BACKGROUND

Traditionally, Field Programmable Gate Array (FPGA) and Application-Specific Integrated Circuit (ASIC) based methods are used for providing data-plane processing in software defined networks. However, FPGA based methods have limited processing capacity and they are inefficient in utilizing power. In addition, changing/running/maintaining FPGA codes (particularly customer developed FPGA codes) are extremely challenging. On the other hand, ASIC processors are not flexible for applying a variety of different processing techniques to satisfy different customer requirements. All these limit the adaptivity needed for delivering high QoS/QoE in many different applications with low-delay and low-jitter requirements such as voice/video/content delivery in software defined networks (SDN).

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for determining a group of coefficients for a digital filter, and configuring the digital filter according to the group of coefficients. Further embodiments can include processing a group of statistics associated with a first data flow utilizing the digital filter, and determining a first statistic from the group of statistics does not satisfy a statistical threshold resulting in a first determination. Other embodiments are described in the subject disclosure.

One or more aspects of the subject disclosure include a device, comprising a processing system including a processor, and a memory that stores executable instructions that, when executed by the processing system, facilitate performance of operations. The operations can comprise determining a group of coefficients for a digital filter, and configuring the digital filter according to the group of coefficients. Further operations can comprise processing a group of statistics associated with a first data flow utilizing the digital filter, and determining a first statistic from the group of statistics does not satisfy a statistical threshold resulting in a first determination.

One or more aspects of the subject disclosure include a non-transitory, machine-readable medium, comprising executable instructions that, when executed by a processing system including a processor, facilitate performance of operations. The operations can comprise identifying a group of data flows, and configuring a digital filter for each data flow of the group of data flows. Further operations can comprise processing a statistic for each data flow resulting in a group of statistics, and determining a first statistic from the group of statistics does not satisfy a statistical threshold resulting in a first determination. Additional operations can comprise providing instructions to a network device based on the first determination.

One or more aspects of the subject disclosure include a method. The method can comprise determining, by a processing system including a processor, a group of coefficients for a digital filter, and configuring, by the processing system, the digital filter according to the group of coefficients. Further, the method can comprise processing, by the processing system, a group of statistics associated with a first data flow utilizing the digital filter, and determining, by the processing system, a first statistic from the group of statistics does not satisfy a statistical threshold resulting in a first determination.

Figure 1:
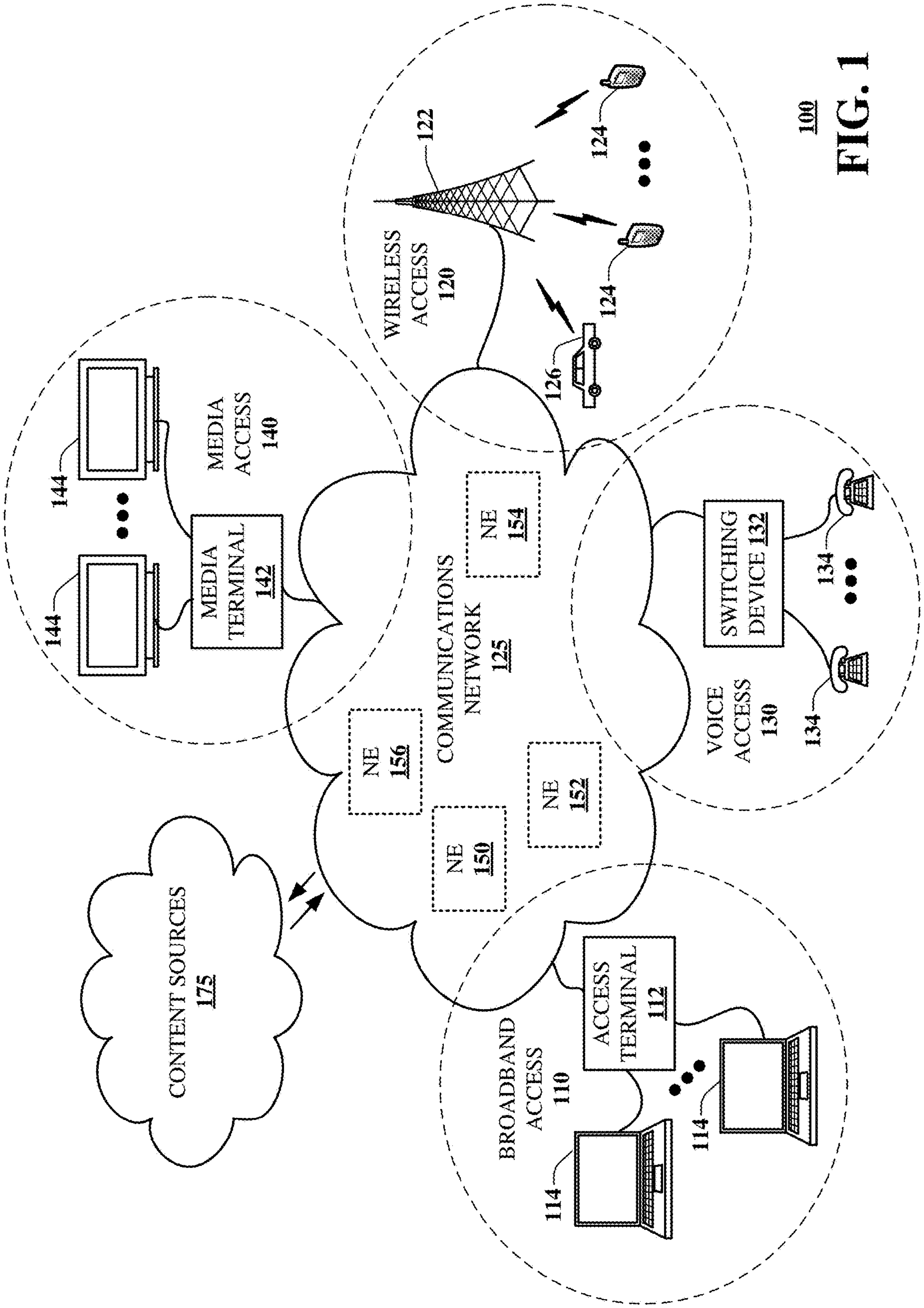
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part monitoring a software defined network (SDN) by determining statistics of data flows associated with the SDN and managing the data flows accordingly. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
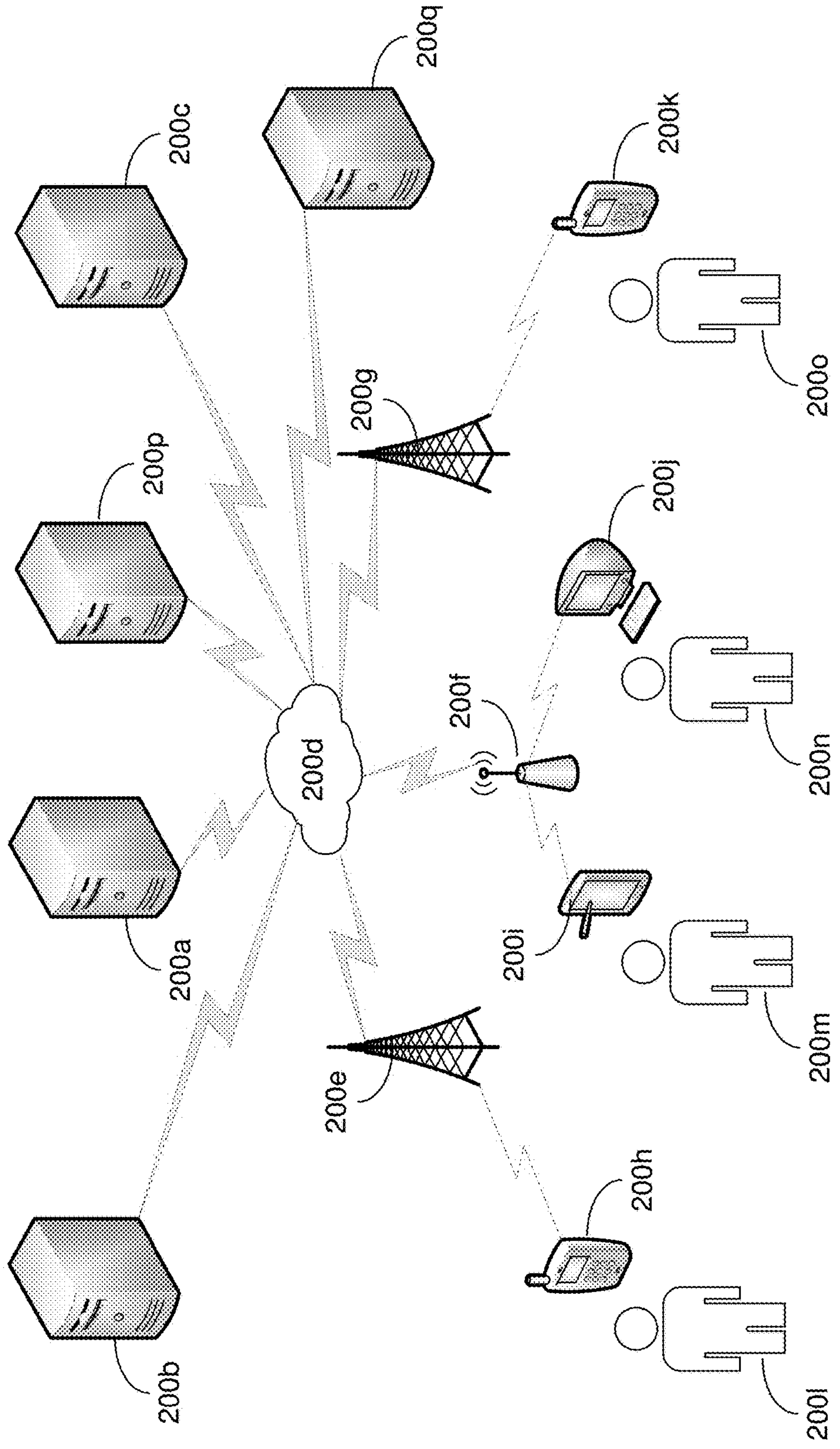
FIGS. 2A-2C are block diagrams illustrating example, non-limiting embodiments of a system functioning within the communication network of FIG. 1 in accordance with various aspects described herein.
Figure 2B:
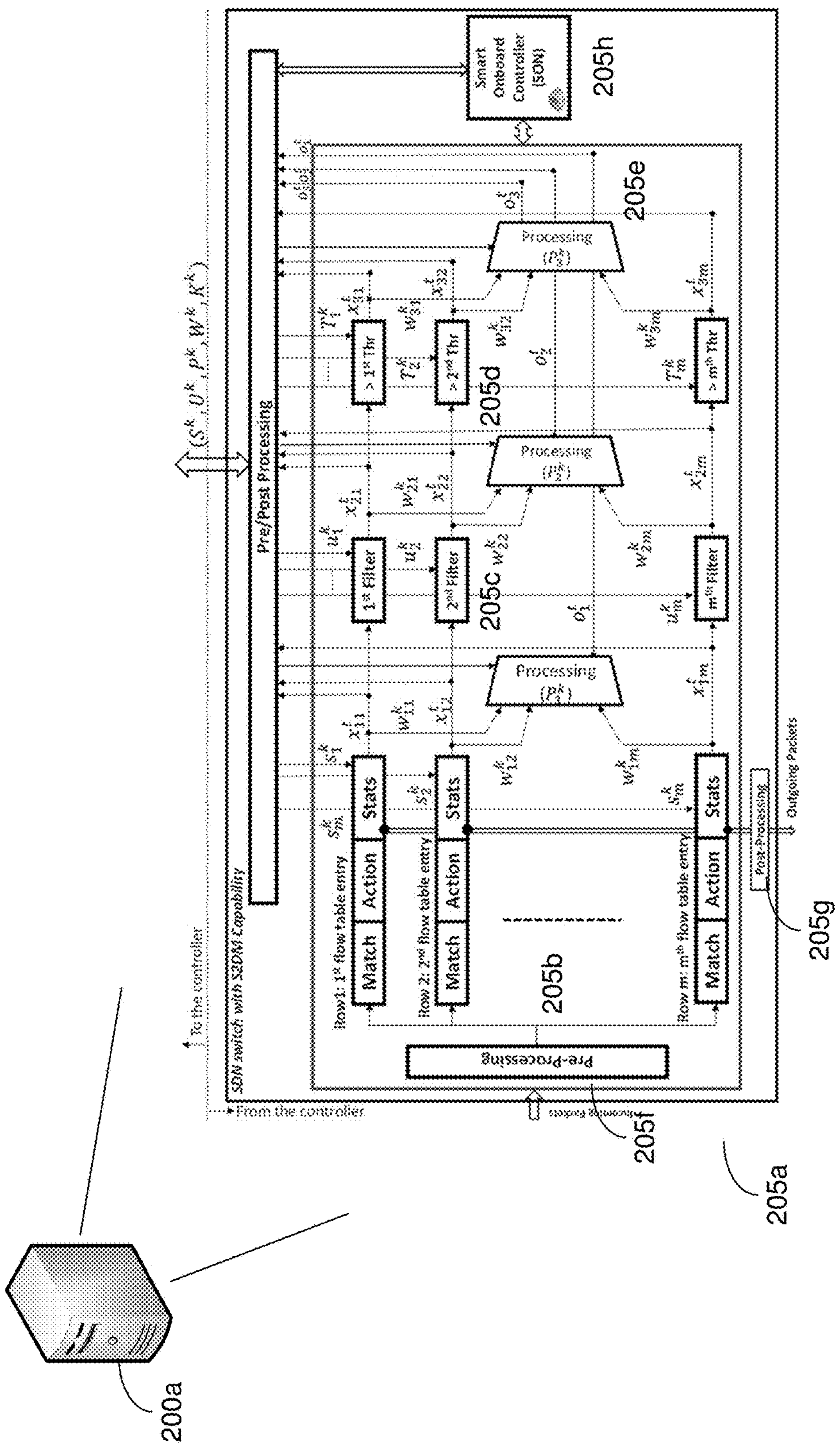
Figure 2C:
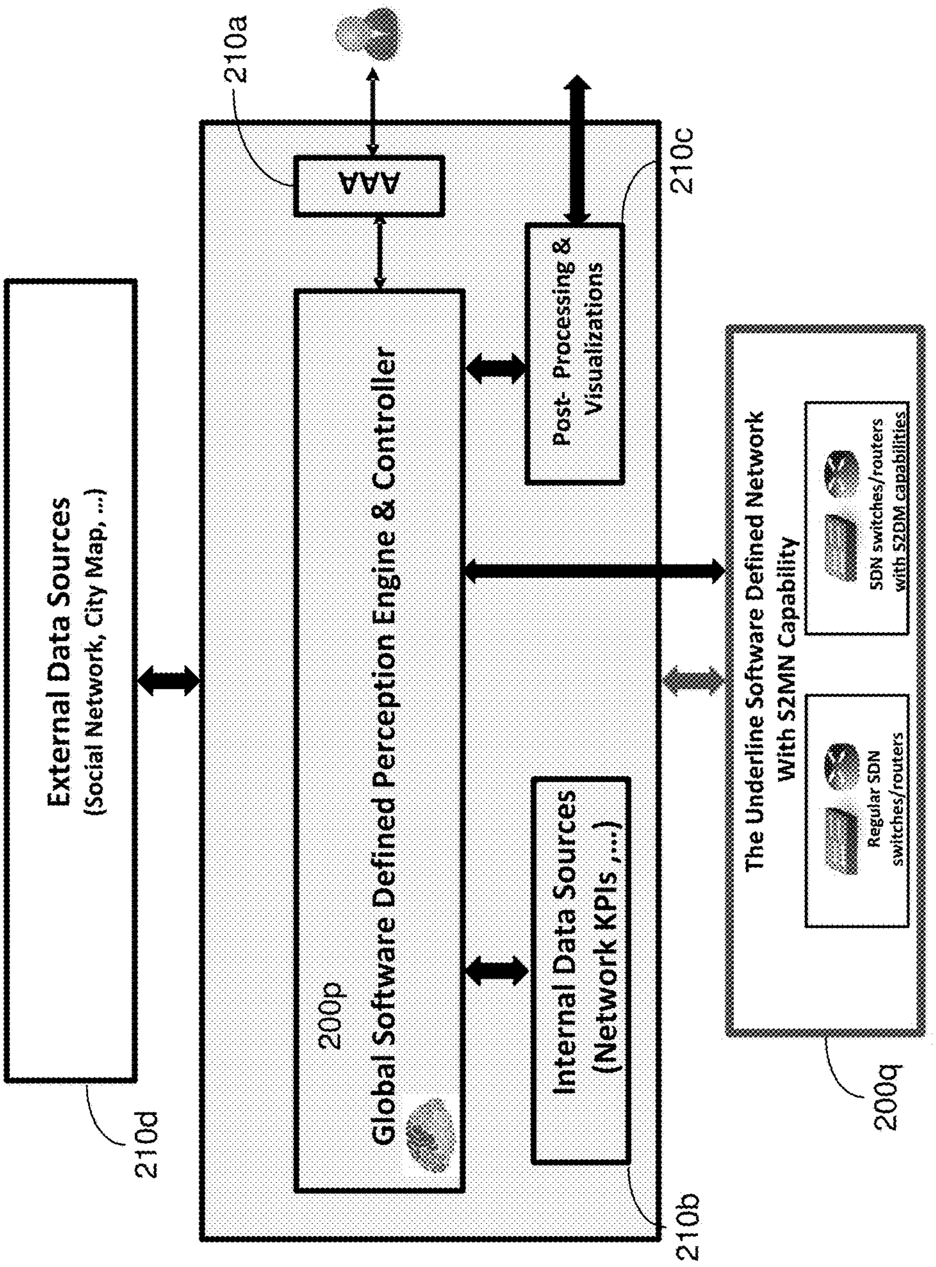

FIGS. 2A-2C are block diagrams illustrating example, non-limiting embodiments of a system functioning within the communication network of FIG. 1 in accordance with various aspects described herein. Referring to FIG. 2A, in one or more embodiments, system 200 comprises a network management device 200*a*, a software defined controller 200*p*, a social media server 200*b*, a content server 200*c*, and a network device 200*q* all of which communicatively coupled to each other over communication network 200*d*. Further, system 200 comprises a communication device 200*h* associated with user 200*l* is communicatively coupled to communication network 200*d* via base station 200*c*. In addition, system 200 comprises a communication device 200*k* associated with user 200*o* is communicatively coupled to communication network 200*d* via base station 200*g*. Also, system 200 comprises a communication device 200*i* associated with user 200*m* and communication device 200*j* associated with user 200*n* are communicatively coupled to communication network 200*d* via wireless access point (e.g., WiFi access point). Communication device 200*h*, communication device 200*i*, communication device 200*j*, and communication device 200*k* are communicatively coupled to the network management device 200*a*, the software defined controller 200*p*, the social media server 200*b*, the content server 200*c*, and the network device 200*q* over communication network. Each of the network management device 200*a*, the software defined controller 200*p*, the social media server 200*b*, the content server 200*c*, and the network device 200*q* can comprise one or more servers or network devices located in one premises or spanning multiple premises/locations, one or more virtual servers located in one premises or spanning multiple premises/locations, one or more cloud servers, etc. The communication network 200*d* can comprise a wireless communication network, a wired communication network, or a combination thereof. Each of communication device 200*h*, communication device 200*i*, communication device 200*j*, and communication device 200*k* can comprise a mobile device, mobile phone, smartphone, tablet computer, laptop computer, desktop computer, wearable device, smartwatch, virtual reality device, augmented reality device, cross reality device, smart television, or any other communication device.

In one or more embodiments, the network management device 200*a* can comprise a smart software defined network monitoring S2DM capability or system that can monitor data flows traversing communication network 200*d* among communication devices and servers. Further, in response in detecting statistical anomalies associated with the data flows that can indicate issues within communication network 200*d*, the network management device can provide instructions to either the SDN controller 200*p* and/or network device 200*q* to mitigate the issues.

Referring to FIG. 2B, in one or more embodiments, the network management device can comprise an SDN switch/router 205*a* with S2DM capability. Delivering high quality content and services to customers in highly-dynamic network (e.g., 5G) environments needs a flexible infrastructure that can react to network behaviors/events in near real-time. Such capability depends on a real-time perception of networks that requires complex intelligent/adaptive processing of sheer volume of network measurements and taking optimal actions to provide high QoS/QoE for customers.

Software Defined Networks (SDNs) are an essential part of 5G and next generation networks. In traditional SDNs, measurements/statistics can be collected at the data plane and can be transferred to a software defined controller for applying complex processing. This approach can expensive in terms of network resources as transferring collected statistics to the software defined controller 200*p* can unreasonably exhaust network bandwidth, introduce large delays for applying real-time/optimal actions that are key for providing high QoS/QoE for customers (particularly for delay-sensitive applications such as voice/video), and increases the risk of intercepting network measurements/statistics by malicious actors, which is not appropriate for critical security applications.

In one or more embodiments, system 205 comprises a highly-capable and flexible framework that provides an alternative to the traditional approach and comprises solution(s) to apply complex and adaptive processing at the data plane and enables applying real-time/optimal actions in a network management device 200*a* that includes an SDN router/switch. Moreover, such a network management device 200*a* provides custom defined network monitoring and management/control at network edges for users that include a universal processing architecture that can be implemented in decentralized/distributed manner. Further, the network management device 200*a* includes the capability to be implemented on physical/virtual routers at network edges such that flexible network data processing services can be offered to customers via a Software as a Service (SaaS) platform. Accordingly, network operators can use this framework to improve network operation/management, increase the security of network/applications, and enhance QOS for customers but also third party users can also use this framework to provide better QoS for their customers, which leads to generating additional revenue for network operators.

In one or more embodiments, FIG. 2B shows the architectural block diagram of the SDN switch/router with S2DM capability. In this architecture, the statistics for each row or flow-table entry can be determined via signals $s_i^k$ (denoting the type of statistics for ith row at discrete time k) 205*b*. Further, $s_1^k, \ldots, S_m^k$ belong to a set of predefined statistics in the SDN router/switch of network management device 200*a*. For example, a predefined statistic can be flow-size in bytes or number of packets matched with each entry over a reconfigurable time-interval.

In one or more embodiments, the statistics associated with ith Math-Action entry at time t (denoted by $x_{i1}^t$ in FIG. 2B, where i=1, 2, . . . , m) is then processed in multiple stages. In the first step, the ith statistics $x_{i1}^t$ is passed through ith filter 205*c*, which can be realized, for example, using a Finite Impulse Response (FIR) or an Infinite Impulse Response (IIR) filter. The order and coefficients of these filters are re-configurable and re-programmable. The output of the ith filter (denoted by $x_{i2}^t$ in FIG. 2B) is passed through a soft/hard thresholding unit 205*d* (which applies non-linear processing on inputs) to generate $x_{i3}^t$, which is a binary or discrete value and can be compressed, effectively. The threshold and characteristics of thresholding units (denoted by $T_i^k$, for thresholding function at ith row and discrete time k) are re-configurable/re-programmable. The outputs of all rows (each row is associated with a flow-table entry) at each stage can be weighted by $w_{ij}^k$ (denoting weight for ith row, jth stage at discrete time k) and additionally processed by processing units $P_j^k$ (where in FIG. 2B, j=1, 2, 3, for example). The logic and weights of these processing units are programmable (examples of processes are weighted linear/non-linear combination of inputs or applying a bank of FIR filters on inputs). The output 205*c* of the jth processing unit is denoted by $o_j^t$. The architecture shown in FIG. 2B (filter bank architecture with nonlinear processing capability) not only can implement/approximate many complex analyses required in different network monitoring applications (e.g. network anomaly detection and security applications) including applying Fast Fourier Transform (FFT), Wavelet Transform and Artificial Neural Networks, but also this reconfigurable/reprogrammable architecture paves the way to apply these analyses in an intelligent and adaptive way. This architecture can be implemented in both hardware (for a more efficient and real-time reactions to network events) or software (for a cheaper and more scalable implementation).

Pre-processing 205*f* and post-processing 205*g* in FIG. 2B includes a variety of different operations including buffering incoming packets, IP address translation of incoming packets (i.e. changing the IP address of incoming packets for a more efficient processing inside the switch/router) and de-translation of out-going packets (encapsulating the original IP address into the outgoing packets for the correct routing of packets), decoding of incoming signals to reconfigure the modules and the compression of output data before transmitting to the SDN controller (shown in FIG. 2C).

This architecture can be implemented on physical SDN switches/routers as hardware integrated circuits. In such a case, it can provide highly flexible data plane processing capabilities that support applying a wide range of real-time computations (from low to complex operations) in an efficient way with low power consumption. Additionally, it can also be implemented in software on virtual SDN switches and routers.

All reprogrammable and reconfigurable modules, variables and parameters in this architecture can be programmed/reconfigured by the user (e.g., network operator personnel), SDN controller or Smart Onboard Controller (SON) 205*h*. Note that, although in FIG. 2B the notation k has used to denote the time-instance that module(s)/parameter(s) are re-configured or re-programmed, it is not necessarily that all module(s)/parameter(s) are re-configured or re-programmed at same time instance k and reconfiguration can be done at different instances for each module/parameter, based on the user requirements, SDN controller logic or SON logic.

Moreover, although in FIG. 2B, it is shown in the architecture with one filter and thresholding stage, the number of filters and thresholding units for each row can also varies depending on the complexity of the operation required. In addition and without loss of generality, in more complicated architectures, each filter at each stage may also process inputs from single/multiple previous units at different rows/stages.

Input signals can be processed and appropriately applied to reconfigurable module(s) to change different parameters. Also, this architecture has the capability to report a set of outputs from different stages. For example, in a useful conservative mode, the architecture can report $x_{i3}^t$ (for i=1, . . . , m) or $o_3^t$ which can be binary/digital values which can be compressed effectively. Such capability not only enables timely detection of important events in the underlying networks and near real-time reconfiguration of the software defined switches/routers to guarantee satisfying the Service Level Agreement for customers but also reduces the amount of data transferred to the SDN controller (more efficient use of network bandwidth) and increases the security of network/data.

Smart Onboard Controller (SON) 205*h* is in direct contact with the SDN Controller, shown in FIG. 2C. SON logic can be programmed by the SDN controller or by the user.

The inputs to SON 205*h* are local network measurements from the switch/router and also inputs provided by the SDN controller, including limited (un) processed network KPIs (e.g. KPIs indicating the jitter in video). The SON 205*h* can adjust/change all reconfigurable parameters of the architecture (e.g. filter weights and thresholds in FIG. 2B). Moreover, it can apply near real-time controlling actions on the incoming packets, including reconfiguring flow-table entries that results in redirecting incoming packets to, for example, a different output port.

Referring to FIG. 2C, in one or more embodiments, systems 210 can comprise a Global Software Defined Perception Engine & Controller (i.e., SDN Controller) 200*p* in which a user end device utilizes the Authentication, Authorization & Accounting (AAA) 210*a* module to access the SDN Controller 200*p*. Further, system 210 can comprise the network management device 200*a* that includes the S2DM capability, internal data sources, pot-processing and visualizations, and external data sources. This framework acts as SaaS platform and develops and distributes the intelligence to reconfigure the underline SDN devices, including physical/virtual SDN switches and routers with and without smart software defined monitoring (S2DM) capability. Machine learning and artificial intelligence algorithms can be used to develop effective perception algorithm(s) to identify important events (e.g. network anomalies and security attacks) in the network in a timely manner and apply optimal network management and control actions. For this purpose, data from different internal data sources 210*b* (including network measurements and KPIs) and external data sources 201*d* (e.g. social networks) are used to develop supervised and unsupervised ML algorithms including deep learning and (deep)-reinforcement algorithms. Such intelligence can be distributed and instantiated at the edges to provide low-latency services/responses.

In one or embodiments, the network management device 200*a* including a switch/router comprising S2DM capability and the SDN controller 100*q* can be used in several different applications (e.g., use cases). For example, based on the configuration of all or subset of modules in network management devices including SDN switches/routers with S2DM capability, the outputs at each row and/or stage can identify various important events in the underlying networks such as the presence of Denial of Service (DOS) or Distributed Denial of Service (DDOS) attacks on a social media server 200*b*. For example, if the coefficients of a FIR/IIR filter 205*c* in ith row is set as high-pass filter, the presence of a sudden-sharp increase in the statistics associated with the ith row can be reliably identified (without using a high-pass filter, the false-alarm is high). By setting an appropriate threshold 205*d* for the threshold unit in ith row (which can be set adaptively using global SDN controller 200*p* or SON 205*h*), the presence of a sudden sharp increase can be reliably detected which may indicate the presence of a DOS attack targeting the destination IP (e.g., social media server 200*b*) associated with the ith flow-table entries. Note, that in network management devices 200*a* comprising SDN switches, each flow-table entry is identified by a programmable tuple with multiple elements, for example, <source-IP, destination-IP, source-port, destination-port, protocol> and the incoming packets are matched against all m flow-table entries and the action of the row with the best match is applied to an incoming packet.

In another example, without loss of generality, assume there are n out of m flow-table entries targeting the same destination IP. Denote these n flow table entries as {Fi}i∈I where I={i1, i2, . . . , in} and each member of set I belongs to set {1, 2, . . . , m}. At time interval k, set $w_{i1}^{k}=0$ for all flow-table entries that are not belonged to set I and construct $P_1^k$ as a weighted linear combination process. Using the SDN controller or local SON 205*h* let set $wi_1^k \# 0$ for all flow-table entries that belong to set/and setting the linear combination weights for a desired characteristic(s). In this case the output $o_1^t$ 205*e* is a reliable representation of the aggregate statistics targeting same destination IP from different source IPs, for example. If $o_1^t$ is higher than some threshold, it is an indication of the fact that multiple source IPs (from different flow-table entries) send considerable amount of flow toward a destination IP which is the signature of a DDOS attack. The SDN controller 200*p* can be informed, and further analysis can be applied at the SDN controller 200*p* to identify the presence of DDOS using the intelligence at SDN controller 200*p*. Moreover, the SDN controller 200*q* or the local SON 205*h* can reconfigure the routing-table to reroute the packets from well-known trustworthy sources such as communication device 200*h*, communication device 200*i*, communication device 200*j*, and communication device 200*k* (which can lead to dropping others). This can be done for example by further limiting source-IP part of the flow-table.

In a further example, if the flow-size or the number of packets for a flow-table entry is significantly increased during some time interval (e.g. higher than some predetermined threshold) according to a statistic at the network management device 200*a* than include an SDN switch/router, then the switch's/router's buffer may drop some of the packets which results in low QoS for different applications particularly delay sensitive applications such as voice/video content delivery. In such case, the SON 205*h* can be programmed to automatically split one flow-table entry into multiple flow-table entries, each match with part of the original source IP addresses.

In an additional example, the network management device 200*a* can be used to provide custom defined network monitoring and management/control solutions at the network edges for third party users with low delays. In fact, the network management device 200*a* can be used to provide flexible network data processing services for users as a Software as a Service (SaaS) platform. In this example, an operator/user can reconfigure the universal processing architecture of the network management device 200*a* that include an SDN switch/router with S2DM capability. For example, and based on the application, a user can change filter coefficients or change the threshold for threshold modules in FIG. 2B. Such changes can be applied to those rows that a user have permission to apply changes. These changes can be applied directly via user request or via SON 205*h*.

Figure 2D:
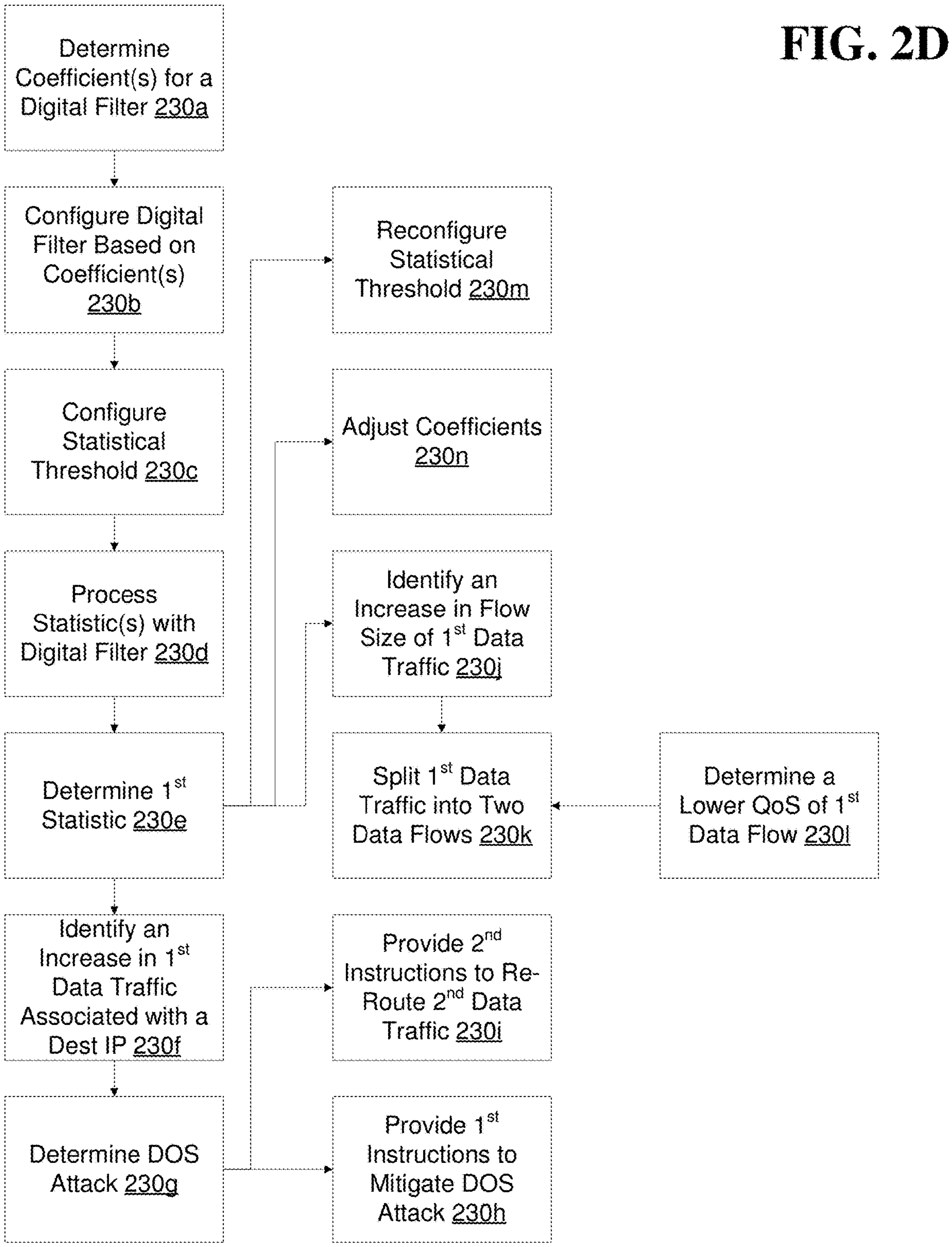
FIGS. 2D-2E depicts illustrative embodiments of methods in accordance with various aspects described herein.
Figure 2E:
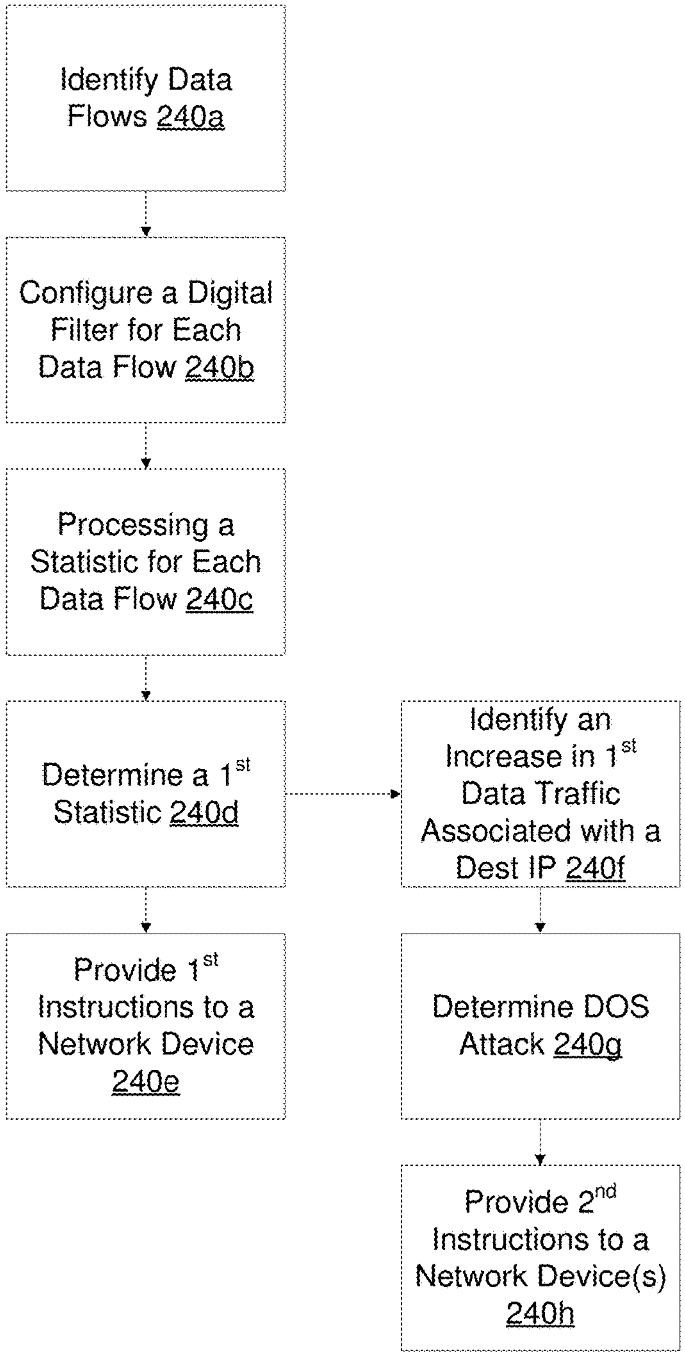

FIGS. 2D-2E depicts illustrative embodiments of methods in accordance with various aspects described herein. Referring to FIG. 2D, in one or more embodiments, method 230 can be implement by a network management device that includes an SDN switch/router with S2DM monitoring. The method 230 can include the network management server, 230*a*, determining a group of coefficients for a digital filter. Further, the method 230 can include the network management server, 230*b*, configuring the digital filter according to the group of coefficients. In addition, the method 230 can include the network management server, 230*c*, configuring the statistical threshold. for each of a group of statistics associated with a first data flow utilizing the digital filter. Also, the method 230 can include the network management server, at 230*d*, processing a group of statistics associated with a first data flow utilizing the digital filter. Further, the method 230 can include the network management server, at 230*e*, determining a first statistic from the group of statistics does not satisfy a statistical threshold resulting in a first determination.

In one or more embodiments, the method 230 can include the network management server, at 230*f*, identifying an increase in first data traffic to a communication device associated with a destination IP address based on the first determination. Further, the method 230 can include the network management server, at 230*g*, determining a denial of service (DOS) attack on the communication device associated with the destination IP address based on the increase in traffic. In addition, the method 230 can include the network management server, at 230*h*, providing first instructions to a group of network devices that indicate to mitigate the DOS attack on the communication device. Also, the method 230 can include the network management server, at 230*i*, providing second instructions to a software defined network (SDN) controller to indicate to re-route second data traffic from the communication device.

In one or more embodiments, the method 230 can include the network management server, at 230*j*, identifying an increase of flow size associated with the first data flow over a time period based on the first determination. Further, the method 230 can include the network management server, at 230*k*, splitting the first data flow into the first data flow and a second data flow to decrease the flow size associated with the first data flow. In addition, the method 230 can include the network management server, at 230*l*, determining a lower quality of service (QOS) associated with first data flow with the increase of flow size resulting in a second determination. In some embodiments, the splitting of the first data flow comprises splitting the first data flow based on the second determination.

In one or more embodiments, the method 230 can include the network management server, at 230*m*, re-configuring the statistical threshold based on the first determination. In some embodiments, user or network operator personnel can determine that the statistical threshold needs to be adjusted to identify statistical anomalies based on current network conditions. Further, the method 230 can include the network management server, at 230*n*, adjusting the coefficients of the digital filter based on the first determination. In further embodiments, user or network operator personnel can determine that the coefficients of the digital filters need to be adjusted to identify statistical anomalies based on current network conditions. Note, in some embodiments, the digital filter can comprise a high pass filter.

Referring to FIG. 2E, in one or more embodiments, method 240 can be implement by a network management device that includes an SDN switch/router with S2DM monitoring. The method 240 can include the network management server, 240*a*, identifying a group of data flows. Further, the method 240 can include the network management server, 240*b*, configuring a digital filter for each data flow of the group of data flows. In addition, the method 240 can include the network management server, 240*c*, processing a statistic for each data flow resulting in a group of statistics. Also, the method 240 can include the network management server, 240*d*, determining a first statistic from the group of statistics does not satisfy a statistical threshold resulting in a first determination. Further, the method 240 can include the network management server, 240*c*, providing first instructions to a network device based on the first determination. In some embodiments, the providing of the first instructions comprise providing the instructions to the network device that indicate to mitigate the DOS attack on the communication device. In other embodiments, the providing of the first instructions comprise providing the instructions to the network device to indicate to re-route second data traffic from the communication device. The network device can comprise a software defined network (SDN) controller. The digital filter can comprise a high pass filter.

In one or more embodiments, the method 240 can include the network management server, 240*f*, identifying an increase in first data traffic to a communication device associated with a destination IP address based on the first determination. Further, the method 240 can include the network management server, 240*g*, determining a denial of service (DOS) attack on the communication device associated with the destination IP address based on the increase in traffic. In addition, the method 240 can include the network management server, 240*h*, providing second instructions to a group of network devices that indicate to mitigate the DOS attack on the communication device In one or more embodiments, a network management device can determine a group of coefficients for a digital filter, and configure the digital filter according to the group of coefficients. Further, the network management device can determine and configure processing a group of statistics associated with a group of data flows traversing a communication network utilizing a group of processors. A portion of the group of data flows can be processed utilizing the digital filter. In addition, the network management device can determine a first statistic from the group of statistics does not satisfy a statistical threshold resulting in a first determination, and based on the first determination, identifying a group of instructions for a group of network devices. Some of the instructions can mitigate security issues (e.g., DOS or DDOS attacks) in the communication network while other instructions can improve quality of service to communication devices utilizing the communication network based on one or more of the group of statistics.

In one or more embodiments, the network management device can identify an event (e.g., increase in data traffic in a data flow, lower QoS, security issue, etc.) in the communication network based on measurements associated with the group of data flows. In further embodiments, the digital filter and the group of processors are configured by one of a software defined network (SDN) controller remotely and a smart onboard (SON) controller locally, wherein the group of network devices includes the SDN controller. In addition the network management device can identify a change in first data traffic to a communication device (e.g., social media server) associated with a first data flow from the group of data flows based on the first determination. Also, the network management device can determine and mitigate one of a denial of service (DOS) attack and a distributed denial of service (DDOS) attack on the communication device associated with the first data flow based on the change in first data traffic.

In one or more embodiments, the network management device can provide first instructions from the group of instructions to a one of a SDN controller and a SON controller to indicate an action that include one of re-routing second data traffic from the communication device and dropping packets from the second data traffic. Further, the digital filter comprises a group of filters with different characteristics including a low-pass characteristic, a high-pass characteristic, a band-pass characteristic, and a band-stop characteristic.

In one or more embodiments, the network management device can identify an increase of flow size associated with a second data flow from the group of data flows over a time period based on the first determination, and split the second data flow into two flows such as the second data flow and a third data flow to decrease the flow size associated with the second data flow. Further, the network management device can determine a lower quality of service (QOS) associated with a second data flow with the increase of flow size resulting in a second determination, and the splitting of the second data flow comprises splitting the second data flow based on the second determination.

In one or more embodiments, the network management device can adjust the coefficients of the digital filter based on the first determination. Further, the network management device can adaptively configure the statistical threshold based on the first determination.

While for purposes of simplicity of explanation, the respective processes are shown and described as a series of blocks in FIGS. 2D-2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In some embodiments, one or more blocks can be performed in response to one or more other blocks.

Portions of some embodiments can be combined with portions of other embodiments.

Figure 3:
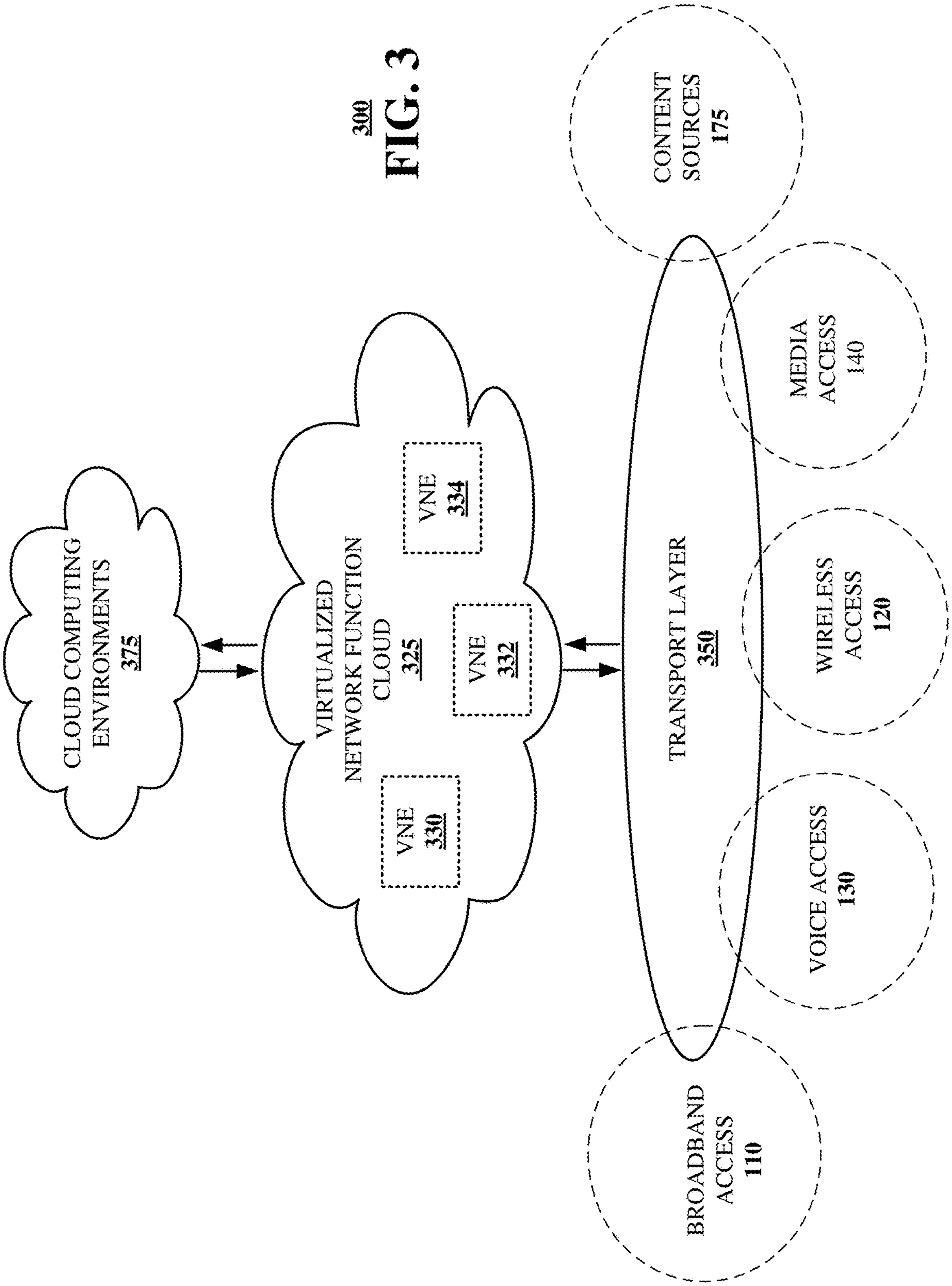
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of systems 200, 205, and 210 and methods 230 and 240 presented in FIGS. 1, 2A, 2B, 2C, and 3. For example, virtualized communication network 300 can facilitate in whole or in part monitoring a software defined network (SDN) by determining statistics of data flows associated with the SDN and managing the data flows accordingly.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
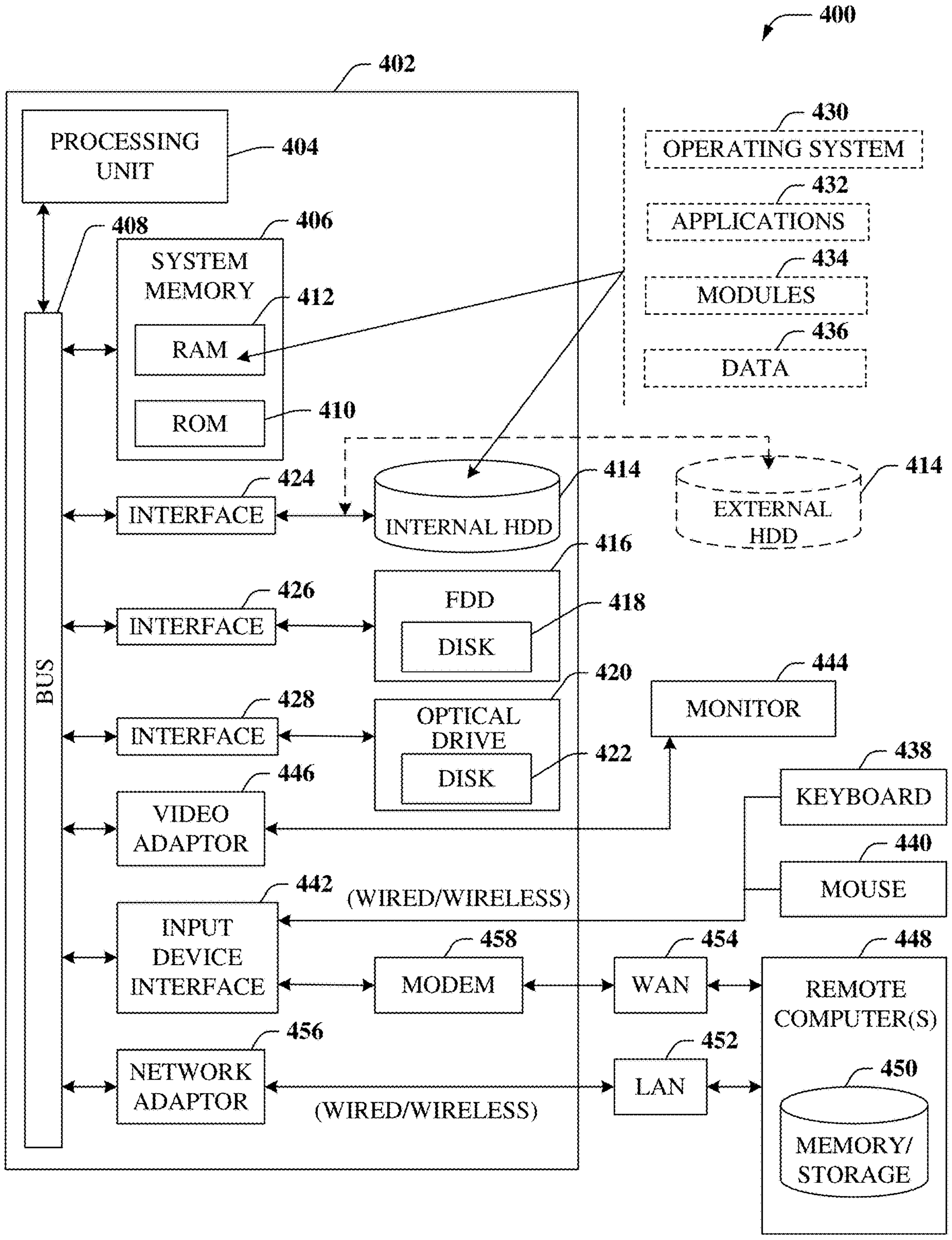
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part monitoring a software defined network (SDN) by determining statistics of data flows associated with the SDN and managing the data flows accordingly. Further, network management device 200*a*, social media server 200*b*, content server 200*c*, SDN controller 200*p*, network device 200*q*, base station 200*c*, base station 200*g*, wireless access point 200*f*, communication device 200*h*, communication device 200*i*, communication device 200*j*, and communication device 200*k* comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
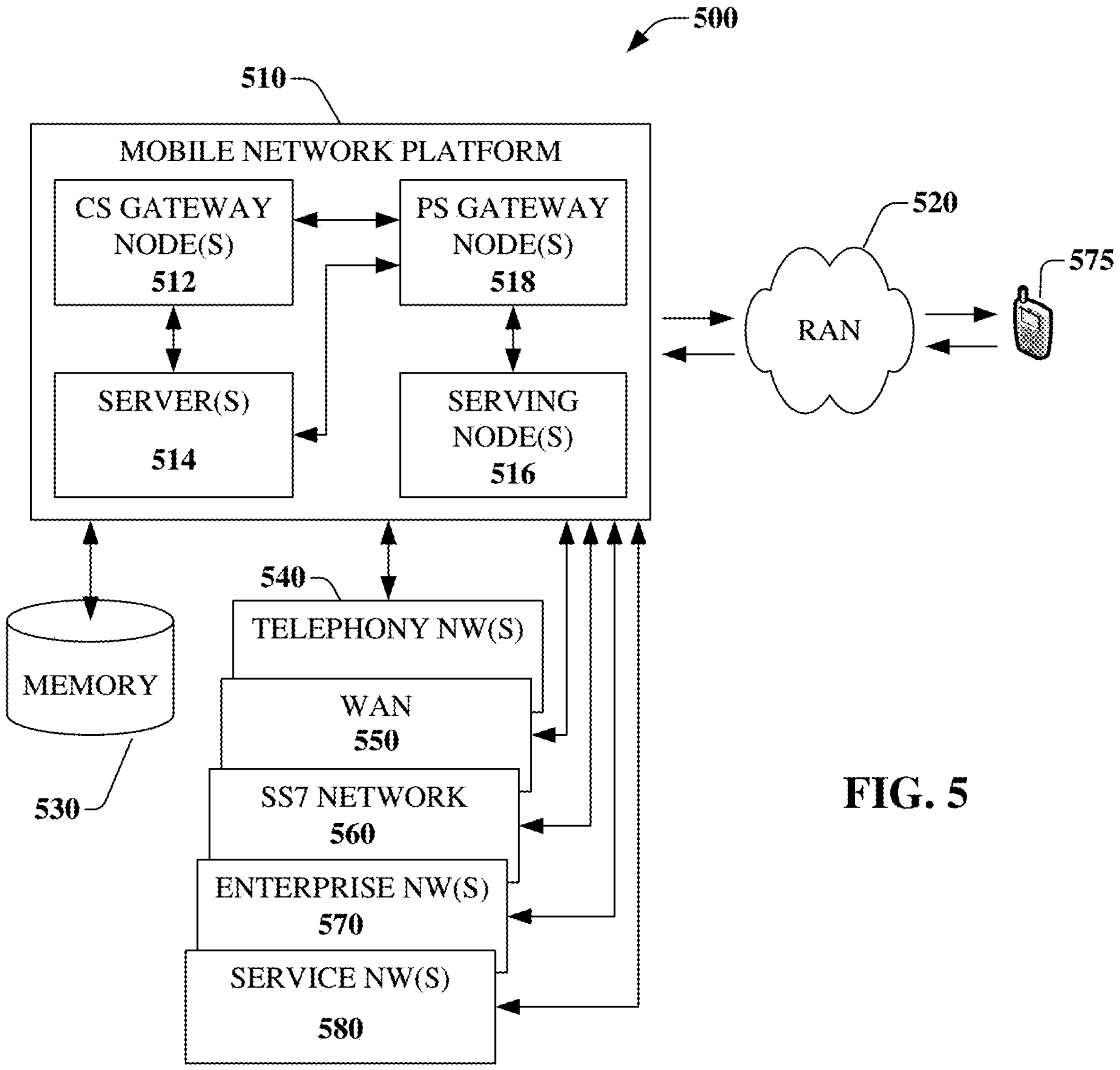
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part monitoring a software defined network (SDN) by determining statistics of data flows associated with the SDN and managing the data flows accordingly. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network

560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flatrate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
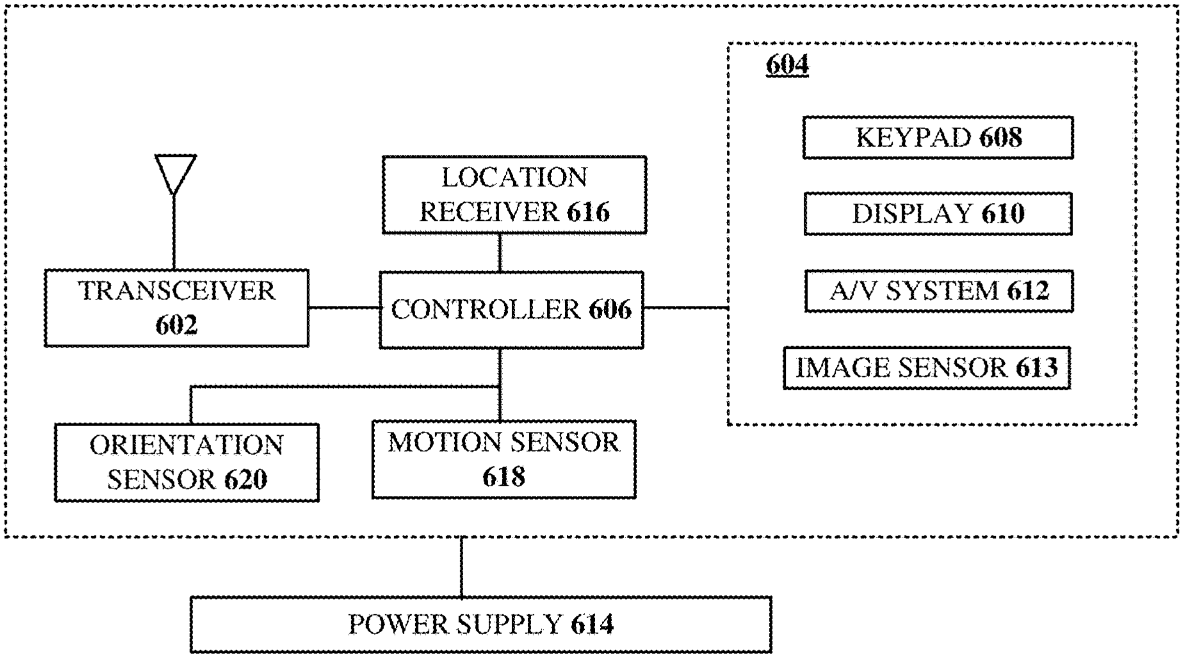
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part monitoring a software defined network (SDN) by determining statistics of data flows associated with the SDN and managing the data flows accordingly. Further, network management device 200*a*, social media server 200*b*, content server 200*c*, SDN controller 200*p*, network device 200*q*, base station 200*c*, base station 200*g*, wireless access point 200*f*, communication device 200*h*, communication device 200*i*, communication device 200*j*, and communication device 200*k* comprise communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human car) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and cast, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words “example” and “exemplary” are used herein to mean serving as an instance or illustration. Any embodiment or design described herein as “example” or “exemplary” is not necessarily to be construed as preferred or advantageous over other embodiments or designs. Rather, use of the word example or exemplary is intended to present concepts in a concrete fashion. As used in this application, the term “or” is intended to mean an inclusive “or” rather than an exclusive “or”. That is, unless specified otherwise or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

Moreover, terms such as “user equipment,” “mobile station,” “mobile,” subscriber station,” “access terminal,” “terminal,” “handset,” “mobile device” (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms “user,” “subscriber,” “customer,” “consumer” and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term “processor” can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as “data storage,” data storage,” “database,” and substantially any other information storage component relevant to operation and functionality of a component, refer to “memory components,” or entities embodied in a “memory” or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term “includes” is used in either the detailed description or the claims, such term is intended to be inclusive in a manner similar to the term “comprising” as “comprising” is interpreted when employed as a transitional word in a claim.

In addition, a flow diagram may include a “start” and/or “continue” indication. The “start” and “continue” indications reflect that the steps presented can optionally be incorporated in or otherwise used in conjunction with other routines. In this context, “start” indicates the beginning of the first step presented and may be preceded by other activities not specifically shown. Further, the “continue” indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) “operably coupled to”, “coupled to”, and/or “coupling” includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
obtaining a first indication of resources that are available to support at least one network feature;
providing, based on the obtaining of the first indication, an offer for access to the resources;
obtaining, based on the providing of the offer, a first acceptance to the offer;
allocating, based on the obtaining of the first acceptance, a first resource of the resources;
defining, based on the allocating, criteria for activating the at least one network feature;
determining, based on the defining, that the criteria has been satisfied, resulting in a first determination; and
activating, based on the first determination, the at least one network feature via the first resource in respect of a first user equipment associated with the first acceptance.

2. The device of claim 1, wherein the criteria include a requirement that the first user equipment is located within a threshold distance of an event.

3. The device of claim 2, wherein the operations further comprise:
determining a location of the first user equipment, resulting in a second determination,
wherein the first determination is based on the second determination.

4. The device of claim 1, wherein the criteria include a requirement that the first user equipment is connected to a network associated with the at least one network feature.

5. The device of claim 4, wherein the operations further comprise:
determining a connection status of the first user equipment in respect of the network, resulting in a second determination,
wherein the first determination is based on the second determination.

6. The device of claim 1, wherein the operations further comprise:
subsequent to the activating, determining that the criteria is no longer satisfied, resulting in a second determination; and
deactivating, based on the second determination, the at least one network feature in respect of the first user equipment.

7. The device of claim 6, wherein the operations further comprise:
activating, based on the deactivating, the at least one network feature via the first resource in respect of a second user equipment that is different from the first user equipment.

8. The device of claim 7, wherein the operations further comprise:
obtaining, based on the providing of the offer, a second acceptance to the offer,
wherein the activating of the at least one network feature via the first resource in respect of the second user equipment is based on the obtaining of the second acceptance.

9. The device of claim 1, wherein the operations further comprise:
subsequent to the activating, determining that an event has ended, resulting in a second determination; and
deactivating, based on the second determination, the at least one network feature in respect of the first user equipment.

10. The device of claim 9, wherein the event includes a sporting event or a concert.

11. The device of claim 9, wherein the activating of the at least one network feature enables the first user equipment to more readily: upload videos or photos at the event, successfully complete data transfers at the event, obtain higher quality voice services at the event, or any combination thereof.

12. The device of claim 1, wherein the defining of the criteria for activating the at least one network feature is based on a use of machine learning, artificial intelligence, or a combination thereof.

13. A non-transitory machine-readable medium, comprising executable instructions that, when executed by a processing system including a processor, facilitate performance of operations, the operations comprising:
obtaining a first indication of resources that are available to support at least one network feature;
allocating, based on the obtaining of the first indication, a first resource of the resources to support a first network feature in respect of a first communication device;
allocating, based on the obtaining of the first indication, a second resource of the resources to support a second network feature in respect of a second communication device, wherein the second network feature is different from the first network feature;
defining, based on the allocating of the first resource, first criteria for activating the first network feature in respect of an event;
defining, based on the allocating of the second resource, second criteria for activating the second network feature in respect of the event;
determining, based on the defining of the first criteria, that the first criteria has been satisfied, resulting in a first determination;
determining, based on the defining of the second criteria, that the second criteria has been satisfied, resulting in a second determination;
activating, based on the first determination, the first network feature via the first resource in respect of the first communication device; and
activating, based on the second determination, the second network feature via the second resource in respect of the second communication device.

14. The non-transitory machine-readable medium of claim 13, wherein the first criteria include a requirement that the first communication device is located within a threshold distance of the event.

15. The non-transitory machine-readable medium of claim 14, wherein the operations further comprise:
determining a location of the first communication device, resulting in a third determination,
wherein the first determination is based on the third determination.

16. The non-transitory machine-readable medium of claim 13, wherein the first criteria include a requirement that the first communication device is connected to a network associated with the first network feature.

17. The non-transitory machine-readable medium of claim 16, wherein the operations further comprise:

determining a connection status of the first communication device in respect of the network, resulting in a third determination, wherein the first determination is based on the third determination.

18. A method, comprising:

identifying, by a processing system including a processor, a network feature for enhancing a quality of a communication service within a threshold distance of an event;

determining, by the processing system, that a user has subscribed for access to the network feature in respect of the event, resulting in a first determination;

determining, by the processing system and based on the first determination, that a first user equipment associated with the user is located within the threshold distance of the event, resulting in a second determination;

determining, by the processing system and based on the first determination, that the first user equipment is connected to a network associated with the network feature, resulting in a third determination; and allocating, by the processing system and based on the second determination and the third determination, a first resource to support the network feature in respect of the first user equipment.

19. The method of claim 18, further comprising:

advertising, by the processing system, the network feature in respect of the event; and obtaining, by the processing system and based on the advertising, a subscription payment from the user, wherein the first determination is based on the obtaining of the subscription payment.

20. The method of claim 18, further comprising:

determining, by the processing system, that the event has ended, resulting in a fourth determination; and reallocating, by the processing system and based on the fourth determination, the first resource to a pool of resources for use by a second user equipment that is different from the first user equipment.

* * * * *